US007680709B1

(12) United States Patent
Hood et al.

(10) Patent No.: US 7,680,709 B1
(45) Date of Patent: Mar. 16, 2010

(54) SELECTION PROCESSING FOR FINANCIAL PROCESSING IN A RELATIONAL DATABASE MANAGEMENT SYSTEM

(75) Inventors: George R. Hood, Poway, CA (US); Brian J. Wasserman, Escondido, CA (US); Thomas K. Ryan, Valley Center, CA (US); Sang Y. Yum, San Diego, CA (US)

(73) Assignee: Teradata US, Inc., Miamisburg, OH (US)

( * ) Notice: Subject to any disclaimer, the term of this patent is extended or adjusted under 35 U.S.C. 154(b) by 1732 days.

(21) Appl. No.: 10/227,783

(22) Filed: Aug. 26, 2002

Related U.S. Application Data

(63) Continuation-in-part of application No. 10/227,909, filed on Aug. 26, 2002, and a continuation-in-part of application No. 10/227,726, filed on Aug. 26, 2002, and a continuation-in-part of application No. 10/228,031, filed on Aug. 26, 2002, and a continuation-in-part of application No. 10/227,976, filed on Aug. 26, 2002, and a continuation-in-part of application No. 10/228,022, filed on Aug. 26, 2002, and a continuation-in-part of application No. 10/016,779, filed on Dec. 10, 2001, now Pat. No. 7,249,138, which is a continuation-in-part of application No. 10/013,422, filed on Dec. 10, 2001, and a continuation-in-part of application No. 10/013,434, filed on Dec. 10, 2001, now Pat. No. 7,461,025, and a continuation-in-part of application No. 10/016,452, filed on Dec. 10, 2001, now Pat. No. 7,383,214, said application No. 10/013,422 is a continuation-in-part of application No. 10/016,779, and a continuation-in-part of application No. 10/013,434, and a continuation-in-part of application No. 10/016,452, said application No. 10/013,434 is a continuation-in-part of application No. 10/016,779, and a continuation-in-part of application No. 10/013,422, and a continuation-in-part of application No. 10/016,452, said application No. 10/016,452 is a continuation-in-part of application No.10/016,779, and a continuation- (Continued)

(51) Int. Cl.
*G06Q 40/00* (2006.01)
(52) U.S. Cl. .......................................... 705/35; 707/10
(58) Field of Classification Search .................... 705/1, 705/8, 30, 35, 36 R, 38; 707/1, 10, 102
See application file for complete search history.

(56) References Cited

U.S. PATENT DOCUMENTS

| 5,189,608 | A | 2/1993 | Lyons et al. |
| 5,249,120 | A | 9/1993 | Foley |

(Continued)

OTHER PUBLICATIONS

Kassing, Jay, "Profitability: Growing the Bottom Line," CSI , 1999, 43 pages.

(Continued)

*Primary Examiner*—Andrew Joseph Rudy
(74) *Attorney, Agent, or Firm*—Gates & Cooper LLP

(57) ABSTRACT

A Value Analyzer system is a data-driven computer-facilitated financial model that provides accurate and consistent profitability calculations using account and event data stored in a relational database managed by a relational database management system (RDBMS), wherein the account data comprises attributes of the accounts being measured and the event data comprises attributes of account-related transactions. A selector function uses selection criteria to select accounts and events from the relational database in order to generate a number of inputs for profitability calculations.

15 Claims, 4 Drawing Sheets

Related U.S. Application Data in-part of application No. 10/013,422, and a continuation-in-part of application No. 10/013,434, and a continuation-in-part of application No. 09/845,461, filed on Apr. 30, 2001, now Pat. No. 7,512,554, and a continuation-in-part of application No. 09/845,924, filed on Apr. 30, 2001, now Pat. No. 7,308,427, and a continuation-in-part of application No. 09/845,851, filed on Apr. 30, 2001, now Pat. No. 7,337,134, and a continuation-in-part of application No. 09/608,355, filed on Jun. 29, 2000, now Pat. No. 7,343,332, and a continuation-in-part of application No. 09/610,646, filed on Jun. 29, 2000, now Pat. No. 7,349,875, and a continuation-in-part of application No. 09/608,681, filed on Jun. 29, 2000, now Pat. No. 7,349,874, and a continuation-in-part of application No. 09/608,675, filed on Jun. 29, 2000, now abandoned, and a continuation-in-part of application No. 09/608,342, filed on Jun. 29, 2000, now abandoned, and a continuation-in-part of application No. 09/608,682, filed on Jun. 29, 2000, now Pat. No. 7,409,365, said application No. 09/845,461 is a continuation-in-part of application No. 09/608,355, and a continuation-in-part of application No. 09/610,646, and a continuation-in-part of application No. 09/608,681, and a continuation-in-part of application No. 09/608,675, and a continuation-in-part of application No. 09/608,342, and a continuation-in-part of application No. 09/608,682, said application No. 09/845,924 is a continuation-in-part of application No. 09/608,355, and a continuation-in-part of application No. 09/610,646, and a continuation-in-part of application No. 09/608,681, and a continuation-in-part of application No. 09/608,675, and a continuation-in-part of application No. 09/608,342, and a continuation-in-part of application No. 09/608,682, said application No. 09/845,851 is a continuation-in-part of application No. 09/608,355, and a continuation-in-part of application No. 09/610,646, and a continuation-in-part of application No. 09/608,681, and a continuation-in-part of application No. 09/608,675, and a continuation-in-part of application No. 09/608,342, and a continuation-in-part of application No. 09/608,682, application No. 10/227,783, which is a continuation-in-part of application No. 09/608,355, and a continuation-in-part of application No. 09/610,646, and a continuation-in-part of application No. 09/608,681, and a continuation-in-part of application No. 09/608,675, and a continuation-in-part of application No. 09/608,342, and a continuation-in-part of application No. 09/608,682.

(56) References Cited

U.S. PATENT DOCUMENTS

| | | | | | |
|---|---|---|---|---|---|
| 5,313,560 | A | * | 5/1994 | Maruoka et al. | 706/50 |
| 5,615,109 | A | | 3/1997 | Eder | |
| 5,655,085 | A | | 8/1997 | Ryan et al. | |
| 5,703,835 | A | * | 12/1997 | Sharkey et al. | 367/124 |
| 5,712,987 | A | | 1/1998 | Waits et al. | |
| 5,721,831 | A | | 2/1998 | Waits et al. | |
| 5,819,237 | A | | 10/1998 | Garman | |
| 5,911,135 | A | | 6/1999 | Atkins | |
| 5,991,743 | A | | 11/1999 | Irving et al. | |
| 6,009,406 | A | * | 12/1999 | Nick | 705/10 |
| 6,018,722 | A | * | 1/2000 | Ray et al. | 705/36 R |
| 6,026,382 | A | | 2/2000 | Kalthoff | |
| 6,085,175 | A | | 7/2000 | Gugel et al. | |
| 6,233,566 | B1 | | 5/2001 | Levine et al. | |
| 6,240,399 | B1 | * | 5/2001 | Frank et al. | 705/36 R |
| 6,249,770 | B1 | * | 6/2001 | Erwin et al. | 705/10 |
| 6,253,192 | B1 | | 6/2001 | Corlett et al. | |
| 6,275,813 | B1 | | 8/2001 | Berka | |
| 6,292,787 | B1 | | 9/2001 | Scott et al. | |
| 6,360,210 | B1 | | 3/2002 | Wallman | |
| 6,393,400 | B1 | * | 5/2002 | Shigetomi et al. | 704/258 |
| 6,393,406 | B1 | | 5/2002 | Eder | |
| 6,418,400 | B1 | * | 7/2002 | Webber | 703/22 |
| 6,513,129 | B1 | * | 1/2003 | Tentij et al. | 714/4 |
| 6,542,905 | B1 | * | 4/2003 | Fogel et al. | 707/200 |
| 6,707,905 | B2 | * | 3/2004 | Lenard | 379/266.01 |
| 6,832,086 | B1 | * | 12/2004 | Powers et al. | 455/423 |
| 6,976,000 | B1 | * | 12/2005 | Manganaris et al. | 705/10 |
| 6,999,944 | B1 | * | 2/2006 | Cook | 705/44 |
| 7,016,868 | B1 | * | 3/2006 | McIntyre et al. | 705/27 |
| 7,050,997 | B1 | * | 5/2006 | Wood, Jr. | 705/36 R |
| 7,249,138 | B1 | * | 7/2007 | Wasserman | 707/102 |
| 7,321,876 | B1 | * | 1/2008 | Wolfston | 705/39 |
| 7,383,214 | B1 | * | 6/2008 | Wasserman et al. | 705/35 |
| 7,461,025 | B1 | * | 12/2008 | Wasserman | 705/37 |
| 2002/0026394 | A1 | | 2/2002 | Savage et al. | |

OTHER PUBLICATIONS

"Canadian Bank Mines for Data-based Gold," Action Items, Dec. 2, 1997, 2 pages.

"Bank of Ireland Selects Compaq AlphaServers to Help Improve Profitability Management," Dec. 3, 1998, Compaq, 2 pages.

"Marquis Tops 300 MCIF-CRM Data Mart Clients Worldwide," Apr. 18, 2000, 2 pages.

Curley, Bob, "Royal Bank unearths profitability solution", Bank Systems & Technology, Apr. 2000, 2 pages.

\* cited by examiner

SELECTION PROCESSING FOR FINANCIAL PROCESSING IN A RELATIONAL DATABASE MANAGEMENT SYSTEM

CROSS REFERENCE TO RELATED APPLICATIONS

This application is a continuation-in-part of the following co-pending and commonly assigned patent applications:

Utility application Ser. No. 10/227,909, filed on same date herewith, by Brian J. Wasserman and Thomas K. Ryan, entitled "PLATFORM INDEPENDENT ARCHITECTURE FOR FINANCIAL PROCESSING IN A RELATIONAL DATABASE MANAGEMENT SYSTEM";

Utility application Ser. No. 10/227,726, filed on same date herewith, by Richard C. Schwarz, Brian J. Wasserman, Sang Y. Yum and Thomas K. Ryan, entitled "DRIVER AMOUNT/COUNT SELECTION FOR FINANCIAL PROCESSING IN A RELATIONAL DATABASE MANAGEMENT SYSTEM";

Utility application Ser. No. 10/228,031, filed on same date herewith, by Brian J. Wasserman, entitled "OBJECT-ORIENTED REPRESENTATION OF A GENERIC PROFITABILITY RULE FOR FINANCIAL PROCESSING IN A RELATIONAL DATABASE MANAGEMENT SYSTEM";

Utility application Ser. No. 10/227,976, filed on same date herewith, by Brian J. Wasserman, George R. Hood and Thomas K. Ryan, entitled "DISCRETE PROFITABILITY CALCULATIONS FOR FINANCIAL PROCESSING IN A RELATIONAL DATABASE MANAGEMENT SYSTEM";

Utility application Ser. No. 10/228,022, filed on same date herewith, by Brian J. Wasserman, George R. Hood and Thomas K. Ryan, entitled "RULES-BASED, DATA-DRIVEN PROFITABILITY CALCULATIONS FOR FINANCIAL PROCESSING IN A RELATIONAL DATABASE MANAGEMENT SYSTEM";

Utility application Ser. No. 10/016,779, filed on Dec. 10, 2001 now U.S. Pat. No. 7,249,138, by Brian J. Wasserman, entitled "PARALLEL SELECTION PROCESSING FOR FINANCIAL PROCESSING IN A RELATIONAL DATABASE MANAGEMENT SYSTEM," which is a continuation-in-part of the applications listed herein that are identified by Ser. Nos. 10/013,422, 10/013,434 and 10/016,452;

Utility application Ser. No. 10/013,422, filed on Dec. 10, 2001, by Brian J. Wasserman, entitled "ACCOUNT SELECTION FOR FINANCIAL PROCESSING IN A RELATIONAL DATABASE MANAGEMENT SYSTEM," which is a continuation-in-part of the applications listed herein that are identified by Ser. Nos. 10/016,779, 10/013,434, and 10/016,452;

Utility application Ser. No. 10/013,434, filed on Dec. 10, 2001 now U.S. Pat. No. 7,461,025, by Brian J. Wasserman, entitled "DRIVER AMOUNT AND COUNT SELECTION PROCESSING FOR FINANCIAL PROCESSING IN A RELATIONAL DATABASE MANAGEMENT SYSTEM," which is a continuation-in-part of the applications listed herein that are identified by Ser. Nos. 10/016,779, 10/013,422, and 10/016,452;

Utility application Ser. No. 10/016,452, filed on Dec. 10, 2001 now U.S. Pat. No. 7,383,214, by Brian J. Wasserman, George R. Hood, and Thomas K. Ryan, entitled "DYNAMIC EVENT SELECTION FOR FINANCIAL PROCESSING IN A RELATIONAL DATABASE MANAGEMENT SYSTEM," which is a continuation-in-part of the applications listed herein that are identified by Ser. Nos. 10/016,779, 10/013,422, 10/013,434, 09/845,461, 09/845,924, 09/845,851, 09/608,355, 09/610,646, 09/608,681, 09/608,675, 09/608,342, and 09/608,682;

Utility application Ser. No. 09/845,461, filed on Apr. 30, 2001 now U.S. Pat. No. 7,512,554, by George R. Hood, entitled "TAX ADJUSTMENT FOR FINANCIAL PROCESSING IN A RELATIONAL DATABASE MANAGEMENT SYSTEM," which is a continuation-in-part of the applications listed herein that are identified by Ser. Nos. 09/608,355, 09/610,646, 09/608,681, 09/608,675, 09/608,342, and 09/608,682;

Utility application Ser. No. 09/845,924, filed on Apr. 30, 2001 now U.S. Pat. No. 7,308,427, by George R. Hood, entitled "AMORTIZATION FOR FINANCIAL PROCESSING IN A RELATIONAL DATABASE MANAGEMENT SYSTEM," which is a continuation-in-part of the applications listed herein that are identified by Ser. Nos. 09/608,355, 09/610,646, 09/608,681, 09/608,675, 09/608,342, and 09/608,682;

Utility application Ser. No. 09/845,851, filed on Apr. 30, 2001 now U.S. Pat. No. 7,337,134, by George R. Hood, entitled "SHAREHOLDER VALUE ADD FOR FINANCIAL PROCESSING IN A RELATIONAL DATABASE MANAGEMENT SYSTEM," which is a continuation-in-part of the applications listed herein that are identified by Ser. Nos. 09/608,355, 09/610,646, 09/608,681, 09/608,675, 09/608,342, and 09/608,682;

Utility application Ser. No. 09/608,355, filed on Jun. 29, 2000 now U.S. Pat. No. 7,343,332, by George R. Hood and Paul H. Phibbs, Jr., entitled "ADVANCED AND BREAKTHROUGH NET INTEREST REVENUE IMPLEMENTATION FOR FINANCIAL PROCESSING IN A RELATIONAL DATABASE MANAGEMENT SYSTEM";

Utility application Ser. No. 09/610,646, filed on Jun. 29, 2000 now U.S. Pat. No. 7,349,875, by George R. Hood and Paul H. Phibbs, Jr., entitled "BASIC AND INTERMEDIATE NET INTEREST REVENUE IMPLEMENTATION FOR FINANCIAL PROCESSING IN A RELATIONAL DATABASE MANAGEMENT SYSTEM";

Utility application Ser. No. 09/608,681, filed on Jun. 29, 2000 now U.S. Pat. No. 7,349,874, by George R. Hood, entitled "OTHER REVENUE IMPLEMENTATION FOR FINANCIAL PROCESSING IN A RELATIONAL DATABASE MANAGEMENT SYSTEM";

Utility application Ser. No. 09/608,675, filed on Jun. 29, 2000 now abandoned, by George R. Hood, entitled "DIRECT EXPENSE IMPLEMENTATION FOR FINANCIAL PROCESSING IN A RELATIONAL DATABASE MANAGEMENT SYSTEM";

Utility application Ser. No. 09/608,342, filed on Jun. 29, 2000 now abandoned, by George R. Hood, entitled "INDIRECT EXPENSE IMPLEMENTATION FOR FINANCIAL PROCESSING IN A RELATIONAL DATABASE MANAGEMENT SYSTEM"; and Utility application Ser. No. 09/608,682, filed on Jun. 29, 2000 now U.S. Pat. No. 7,409,365, by George R. Hood, entitled "RISK PROVISION IMPLEMENTATION FOR FINANCIAL PROCESSING IN A RELATIONAL DATABASE MANAGEMENT SYSTEM,";

all of which applications are incorporated by reference herein.

Finally, this application is related to the following co-pending and commonly assigned patent applications:

Utility application Ser. No. 09/943,060, filed on Aug. 30, 2001, by Paul H. Phibbs, Jr., entitled "CAPITAL ALLOCATION IN A NET INTEREST REVENUE IMPLEMENTATION FOR FINANCIAL PROCESSING IN A RELA- TIONAL DATABASE MANAGEMENT SYSTEM," which claims the benefit under 35 U.S.C. §119(e) to Provisional Application Ser. No. 60/253,281, filed Nov. 27, 2000, by Paul H. Phibbs, Jr., entitled "CAPITAL ALLOCATION IN A NET INTEREST REVENUE IMPLEMENTATION FOR FINANCIAL PROCESSING IN A RELATIONAL DATABASE MANAGEMENT SYSTEM," and Provisional Application Ser. No. 60/253,254, filed Nov. 27, 2000, by Paul H. Phibbs, Jr., entitled "ALLOCATED BALANCES IN A NET INTEREST REVENUE IMPLEMENTATION FOR FINANCIAL PROCESSING IN A RELATIONAL DATABASE MANAGEMENT SYSTEM," and which is a continuation-in-part of the applications listed herein that are identified by Ser. Nos. 09/608,355 and 09/610,646;

Utility application Ser. No. 09/943,059, filed on Aug. 30, 2001, by Paul H. Phibbs, Jr., entitled "ALLOCATED BALANCES IN A NET INTEREST REVENUE IMPLEMENTATION FOR FINANCIAL PROCESSING IN A RELATIONAL DATABASE MANAGEMENT SYSTEM," which claims the benefit under 35 U.S.C. §119(e) to Provisional Application Ser. No. 60/253,254, filed Nov. 27, 2000, by Paul H. Phibbs, Jr., entitled "ALLOCATED BALANCES IN A NET INTEREST REVENUE IMPLEMENTATION FOR FINANCIAL PROCESSING IN A RELATIONAL DATABASE MANAGEMENT SYSTEM," and Provisional Application Ser. No. 60/253,281, filed Nov. 27, 2000, by Paul H. Phibbs, Jr., entitled "CAPITAL ALLOCATION IN A NET INTEREST REVENUE IMPLEMENTATION FOR FINANCIAL PROCESSING IN A RELATIONAL DATABASE MANAGEMENT SYSTEM," and which is a continuation-in-part of the applications listed herein that are identified by Ser. Nos. 09/608,355 and 09/610,646;

both of which applications are incorporated by reference herein.

BACKGROUND OF THE INVENTION

1. Field of the Invention

This invention relates in general to financial processing systems performed by computers, and in particular, to the implementation of selection processing for financial processing using data accessed from a relational database management system.

2. Description of Related Art

Financial processing systems provide tools for financial analysis of accounting data. Typically, each financial processing system operates in a unique way and approaches financial analysis differently. Some financial processing systems are advanced in their approach to profitability calculations, and others are still at a more basic level. In addition, there is no agreement as to the rules for profitability calculations, outside of generally accepted accounting policies that external auditors use.

Yet, the majority of financial processing systems are inefficient in their accessing of relational databases. There is a need, then, for an improved approach to selecting account and event data from a relational database.

SUMMARY OF THE INVENTION

A Value Analyzer system is a data-driven computer-facilitated financial model that provides accurate and consistent profitability calculations using account and event data stored in a relational database managed by a relational database management system (RDBMS), wherein the account data comprises attributes of the accounts being measured and the event data comprises attributes of account-related transactions. A selector function uses selection criteria to select accounts and events from the relational database in order to generate a number of inputs for profitability calculations.

The present invention performs financial processing in a computer by: (a) selecting accounts and events from a database through a selector function, wherein the selector function uses event thresholding to select the accounts and events from the database; and (b) performing one or more profitability calculations in the computer using attributes of the accounts and events selected from the database. The event thresholding uses a specified number of a specified combination of attributes of the events to select the accounts, wherein the specified number comprises an amount of the attributes or a count of the attributes, and the accounts are selected when the specified number exceeds a specified threshold.

The present invention also performs financial processing in a computer by: (a) selecting accounts and events from a database through a selector function that uses one or more selection criteria to select the accounts and events from the database, wherein the selector function groups the selection criteria, so that the grouped selection criteria are processed in parallel; and (b) performing one or more profitability calculations in the computer using attributes of the accounts and events selected from the database. The grouped selection criteria comprise similar selection criteria, and the selection criteria are grouped when the selection criteria are applied to a same level of the accounts, or when the selection criteria are of a same type, or when the selection criteria access identical attributes, or when the selection criteria access identical tables. The grouped selection criteria are processed independently. The profitability calculations use one or more rules, and the grouped selection criteria aggregate sources for the rules, or the grouped selection criteria aggregate drivers for the rules.

In addition, the present invention performs financial processing in a computer by: (a) selecting accounts and events from a database through a selector function that uses one or more selection criteria to select the accounts and events from the database, wherein the selector function invokes one or more macros to perform the selection of the accounts and events; and (b) performing one or more profitability calculations in the computer using attributes of the accounts and events selected from the database. The macros are SQL macros, and are performed by a relational database management system. The macros are grouped together for execution in parallel, and are executed in a correct order by nesting the macros and grouping the nested macros into a high-level control macro. The macros are selected from a group comprising one or more Non-Event Based Selection and Aggregation Macros, one or more Event-Based Selection and Aggregation Macros, and one or more Collation Macros.

Finally, the present invention performs financial processing in a computer by: (a) selecting accounts and events from a database through a selector function that uses one or more selection criteria to select the accounts and events from the database, wherein the selector function generates statements that are executed by a database management system to perform the selection of the accounts and events, and the statements are optimized by the selector function; and (b) performing one or more profitability calculations in the computer using attributes of the accounts and events selected from the database. The statements are optimized to satisfy the selection criteria using as few of the statements as possible. The statements are also optimized so that the statements are executed in parallel by the database management system.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

A Value Analyzer system is a data-driven computer-facilitated financial model that provides accurate and consistent profitability calculations using account and event data stored in a relational database managed by a relational database management system (RDBMS), wherein the account data comprises attributes of the accounts being measured and the event data comprises attributes of account-related transactions. A selector function uses selection criteria to select accounts and events from the relational database in order to generate a number of inputs for profitability calculations.

Hardware and Software Environment

Figure 1:
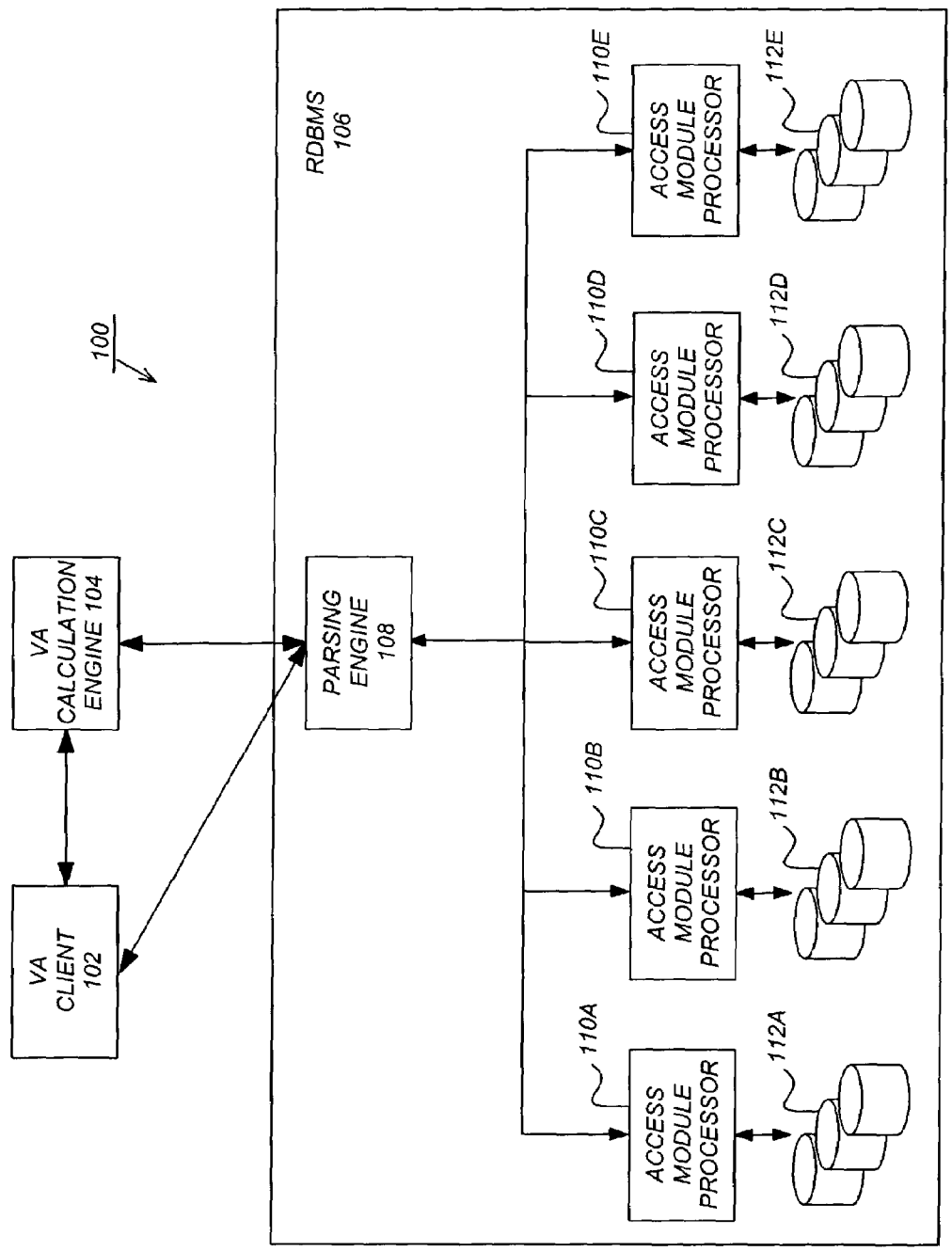
FIG. 1 illustrates an exemplary hardware and software environment according to the preferred embodiment of the present invention.

FIG. 1 illustrates an exemplary hardware and software environment according to the preferred embodiment of the present invention. In the exemplary environment, a computer system 100 implements a financial processing system, known as the Value Analyzer system, in a three-tier client-server architecture, wherein the first or client tier provides a Value Analyzer Client 102 that may include, inter alfa, a graphical user interface (GUI), the second or middle tier provides a Value Analyzer Calculation Engine 104 for performing functions as described later in this application, and the third or server tier comprises a Relational DataBase Management System (RDBMS) 106 that stores data and metadata in a relational database. The first, second, and third tiers may be implemented in separate machines, or may be implemented as separate or related processes in a single machine.

In the preferred embodiment, the RDBMS 106 includes at least one Parsing Engine (PE) 108 and one or more Access Module Processors (AMPs) 110A-110E storing the relational database in one or more data storage devices 112A-112E. The Parsing Engine 108 and Access Module Processors 110 may be implemented in separate machines, or may be implemented as separate or related processes in a single machine. The RDBMS 106 used in the preferred embodiment comprises the Teradata® RDBMS sold by NCR Corporation, the assignee of the present invention, although other DBMS's could be used.

Generally, the Value Analyzer Client 102 includes a graphical user interface (GUI) for operators of the system 100, wherein requests are transmitted to the Value Analyzer Calculation Engine 104 and/or the RDBMS 106, and responses are received therefrom. In response to the requests, the Value Analyzer Calculation Engine 104 performs the functions described below, including formulating queries for the RDBMS 106 and processing data retrieved from the RDBMS 106. Moreover, the results from the functions performed by the Value Analyzer Calculation Engine 104 may be provided directly to the Value Analyzer Client 102 or may be provided to the RDBMS 106 for storing into the relational database. Once stored in the relational database, the results from the functions performed by the Value Analyzer Calculation Engine 104 may be independently retrieved from the RDBMS 106 by the Value Analyzer Client 102.

Note that the Value Analyzer Client 102, the Value Analyzer Calculation Engine 104, and the RDBMS 106 may be implemented in separate machines, or may be implemented as separate or related processes in a single machine. Moreover, in the preferred embodiment, the system 100 may use any number of different parallelism mechanisms to take advantage of the parallelism offered by the multiple tier architecture, the client-server structure of the Value Analyzer Client 102, Value Analyzer Calculation Engine 104, and RDBMS 106, and the multiple Access Module Processors 110 of the RDBMS 106. Further, data within the relational database may be partitioned across multiple data storage devices 112 to provide additional parallelism.

Generally, the Value Analyzer Client 102, Value Analyzer Calculation Engine 104, RDBMS 106, Parsing Engine 108, and/or Access Module Processors 110A-110E comprise logic and/or data tangibly embodied in and/or accessible from a device, media, carrier, or signal, such as RAM, ROM, one or more of the data storage devices 112A-112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Value Analyzer Operation

The Value Analyzer system is a data-driven computer-facilitated financial model that provides accurate and consistent profitability calculations using account, event and organization data stored in the RDBMS 106, wherein: (1) the account attributes comprise data about accounts being measured, (2) the event attributes comprise data about account-related transactions, and (3) the organization attributes comprise data about the organization's financial status. The profitability calculations performed by the Value Analyzer system rely on a Five Factor Atomic Profit Metric (FFAPM):

| Profit | = | Net Interest Revenue (NIR) |
|---|---|---|
|  | + | Other Revenue (OR) |
|  | − | Direct Expense (DE) |
|  | − | Indirect Expense (IE) |
|  | − | Risk Provision (RP) |
|  | = | NIR + OR − DE − IE − RP |

In the above equation, it is assumed that the sign of elements that reduce profit are negative and those that contribute are positive.

Each of the five factors of FFAPM are defined below:

Net Interest Revenue. This component comprises interest revenue, and is the largest component of profitability (e.g., from loans, deposits, cash, etc.).

Other Revenue. This component comprises non-interest revenue (e.g., fees and commissions), including those driven by events (e.g., open account, excessive counter withdrawals, early payout penalties, etc.).

Direct Expense. This component comprises expenses driven by events that are attributable to accounts.

Indirect Expense. This component comprises expenses that are not attributable to specific accounts. This includes expenses that relate to the cost of doing business that are not driven by account or event activity, such as those that arise from overheads, inefficiencies or differences between standard and actual costs (e.g., the CEO's salary, etc.).

Risk Provision. This component comprises the expected cost of risks that arise from the uncertainties of doing business, e.g., market risks, customer credit, competition, operations, regulatory risks, political risks, etc.

Each of these five factors can be measured for a desired period (daily, weekly, monthly, quarterly, etc.). Moreover, each factor is essentially discrete and independent with fundamentally different characteristics, which strengthens the user's ability to fully utilize the output to determine relationships between account, event and organization data, and enable consistent multiple dimensional aggregation.

The FFAPM is "atomic" in that profitability is computed using data stored in the RDBMS 106. There are three aspects to this:

components of profitability may be measured below the account level (at events which make up account activity over an accounting period) and accumulated to the account, components of profitability may be measured directly at the account level (such as interest paid or earned for an accounting period), components of profitability may be known, obtained, or aggregated at a higher level, and may be apportioned down to specific accounts and events according to various rules.

The Value Analyzer generally defines "indirect" components of profitability to be those which must be apportioned to accounts and "direct" components to be those which are either computed at the account level, or are rolled up to the account level from lower level events.

Value Analyzer Data Flow

Figure 2:
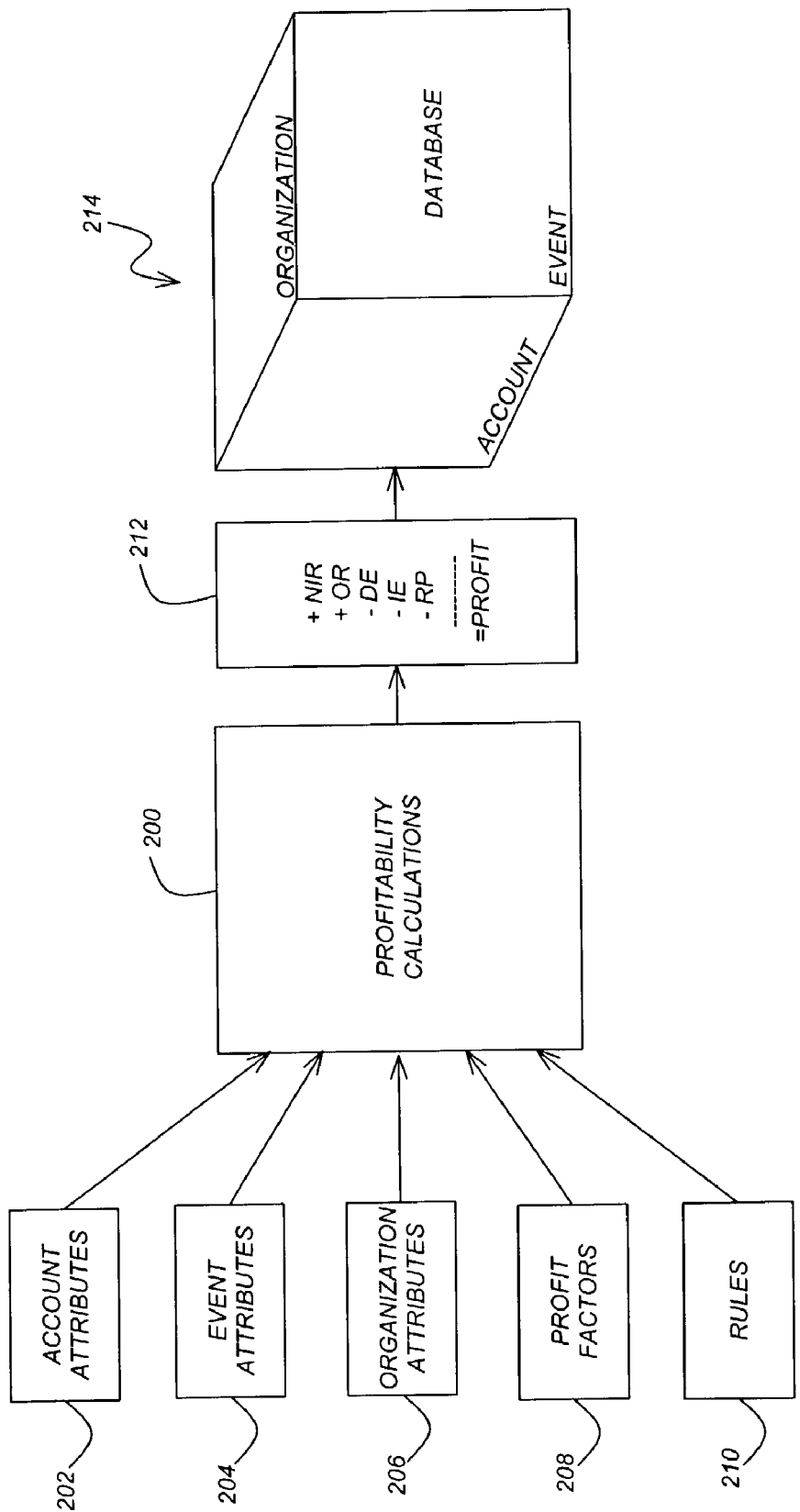
FIG. 2 is a data flow diagram that illustrates the operation of the Value Analyzer according to the preferred embodiment of the present invention.

FIG. 2 is a data flow diagram that illustrates the operation of the Value Analyzer system according to the preferred embodiment of the present invention. Within the Value Analyzer Calculation Engine 104, one or more Profitability Calculations 200 accept a number of inputs including Account Attributes 202, Event Attributes 204, Organization Attributes 206, and Profit Factors 208. Thereafter, the Profitability Calculations 200 invoke one or more Rules 210 that generate the FFAPM 212, which in turn are used to create the Database 214. The Database 214 may be represented along account, event, or organization dimensions, or along other dimensions as may be required. These elements are described in more detail below.

Input Definitions

Account Attributes 202 comprise data about the accounts being measured. This data includes: balance, rate (or interest accrued), product identification, limits, expected default frequency, and various dates (e.g., open, rate reset, last payment, next payment, maturity, etc.).

Event Attributes 204 comprise data about account-related events or transactions. This data includes: account identification, event or transaction amounts, event or transaction location, event or transaction time, counter-party identification, event or transaction type (e.g., loan payment, interest paid, loan draw down amount, etc.).

Organization Attributes 206 comprise data about the financial status of the organization. This data includes: balance sheet and profit statement amounts aggregated by the legal or management entities that own the account base being measured.

Profit Factors 208 include parameter values necessary to perform the Profitability Calculations 200. The major classifications of this data include:

Funds transfer rates are pricing methods that require matched maturity opportunity rates for use in valuing each account's marginal use or source of internal funds.

Unit costs are used for Direct Expense calculations, where a total cost is provided as an Organization Attribute 206 and the Unit Cost is then derived by dividing total cost by actual volume. Unit Costs can be either standard, actual, or market, and ideally represent marginal values (if "fully absorbed measures" are used, then the usefulness of allocated amounts is diminished.)

Allocated amounts are used in both Other Revenue and Indirect Expense calculations, wherein the allocated amounts are apportioned amongst all accounts in a group.

Miscellaneous calculation values may comprise, for example, the number of days in a profit measurement period, an equity allocation weighting, etc. These values are known as "modeling" parameters.

Amortization parameters are used in interest amortization, which requires interest rates and life values used by straight-line amortization and by declining balance of amortization.

Risk measurement parameters are used in Risk Provision calculations, which require various factors, such as: loss rates, reserve percentages, exposure factors, recovery rates, default probabilities and collection costs.

Tax rates are required for after-tax profit calculation. The Value Analyzer is designed to calculate pre-tax income on a taxable equivalent basis (where an effective tax rate is all that is required to transform pre-tax income into after tax earnings, i.e., Profit).

Rules

The Profitability Calculations 200 use one or more Rules 210 applied to data retrieved from the RDBMS 106. These Rules 210 include, inter alia, the following:

Treatments. Every account with cash flows affecting a organization's balance sheet requires a method of valuing the account's use of internal funds. One approach is "matched maturity funds transfer pricing," which uses a canonical representation of an account's funding characteristics and then determines a value based on adjusted market yields for each instance that requires an interest rate transfer price to calculate an account's marginal Net Interest Revenue.

Equity Allocation. In order to provide precise Net Interest Revenue calculations, the amount of equity funds required at an account must be determined. This rule allows for equity allocation using any of the following methods: simple ratios; regulatory definitions; economic allocations, or user defined allocations.

Apportionment. Other Revenue, Risk Provision and Indirect Expense calculations are applied at the account level using Organization Attributes 206 that are not related directly to account activity. These profit adjustments are made so that the sum of all account-level Profitability Calculations 200 comprises the overall profit. One approach is to pool indirect costs and revenues and then apportion them. Apportionment rules specify how the pooled indirect costs and revenues is completely allocated to appropriate accounts, wherein the preferred embodiment uses closed form allocation rules, which require only information known in the current period and not iterative computation.

Amortization. Some types of income or expense are deferred or accrued over multiple periods, including and subsequent to the current accounting period. This is common to accrual accounting methods used in profit presentations of financial statements, and gives rise to timing differences between cash flows and their related profit as presented in a financial statement in any accounting period. Since the Value Analyzer system is designed to reconcile to the financial statement's profit values, it supports deferral and accrual accounting principles. Amortization methods that account for these timing differences are: interest amortization (used for interest income and expense accruals and for deferral of fees that are in lieu of interest), and straight line or declining balance amortizations (used for cost deferrals and investment depreciation).

Other Revenue Pricing. In situations where account and event activity can be used to derive account level income or fees, the Value Analyzer system calculates these drivers of the profitability in the Other Revenue calculations. These calculations comprise linear combinations of event or account values and modeled coefficients.

Direct Expense. The calculation of account profit adjustments due to account-related activity requires rules that take the form of linear combinations of event or account values and modeled coefficients.

Indirect Expense. In situations where expense apportionment or amortization amounts are aggregated, the user may want different rules applied depending on the path (or dimension) of aggregation. These rules allow for multiple Profitability Calculations rules to be applied to derive multiple account level Indirect Expense amounts.

Risk Provision. Adjusting current profit for expected future losses is known as "actuarial" profit provisioning. The Value Analyzer system applies actuarial-based methods in its account level Profitability Calculations, where the actuarial reserve that the provisions maintain represents the expected loss associated with all accounts.

Taxable Equivalent Gross-up. Profit is an after-tax measure, and thus some events or portions of some accounts' profits may be excluded from normal taxation. The Value Analyzer system adjusts these pre-tax values, so that a singular tax rate can be used to convert pre-tax profit into after-tax values, which are also known as taxable equivalent adjustment. These rules use account and event attributes to adjust each of the five factors of the FFAPM to a taxable equivalent basis.

Interest Yield Adjustments. Since the Value Analyzer system can calculate profits for any number of periods, the adjustment of cash interest payments, and the financial statement's accrual or smoothed representation of interest-related Profit, the Value Analyzer system provides a method for converting cash interest amounts to accrual amounts for financial statements. The Value Analyzer system implements an "effective interest rate" conversion to accomplish this type of calculation.

Profitability Calculations

The following describes the method used by the Profitability Calculations 200:
1. Retrieve data from the RDBMS 106.
2. Calculate Net Interest Revenue for every account.
3. Calculate Other Revenue for every account.
4. Calculate Direct Expense for every account.
5. Calculate Indirect Expense for every account.
6. Calculate Risk Provision for every account.
7. Calculate Profit for every account.
8. Store the FFAPM Profit and the five factors of FFAPM into the RDBMS 106.
9. Aggregate and/or re-calculate the FFAPM Profit and the five factors of FFAPM as necessary.

Note that steps 2 through 6 perform account-level calculations. Steps 2, 3, 4, 5, and 6 can be performed independently and in parallel, while step 7 requires values derived in steps 2, 3, 4, 5, and 6, and therefore must be performed after steps 2, 3, 4, 5, and 6 are completed.

Output Definition

The Profitability Calculations 200 generate one or more values for the five factors of the FFAPM 212, and specifically, the NIR, OR, DE, IE, RP, and Profit values. These values are used to generate the Database 214, which comprises one or more tables stored by the RDBMS 106 in the relational database.

Selector Function

Figure 3:
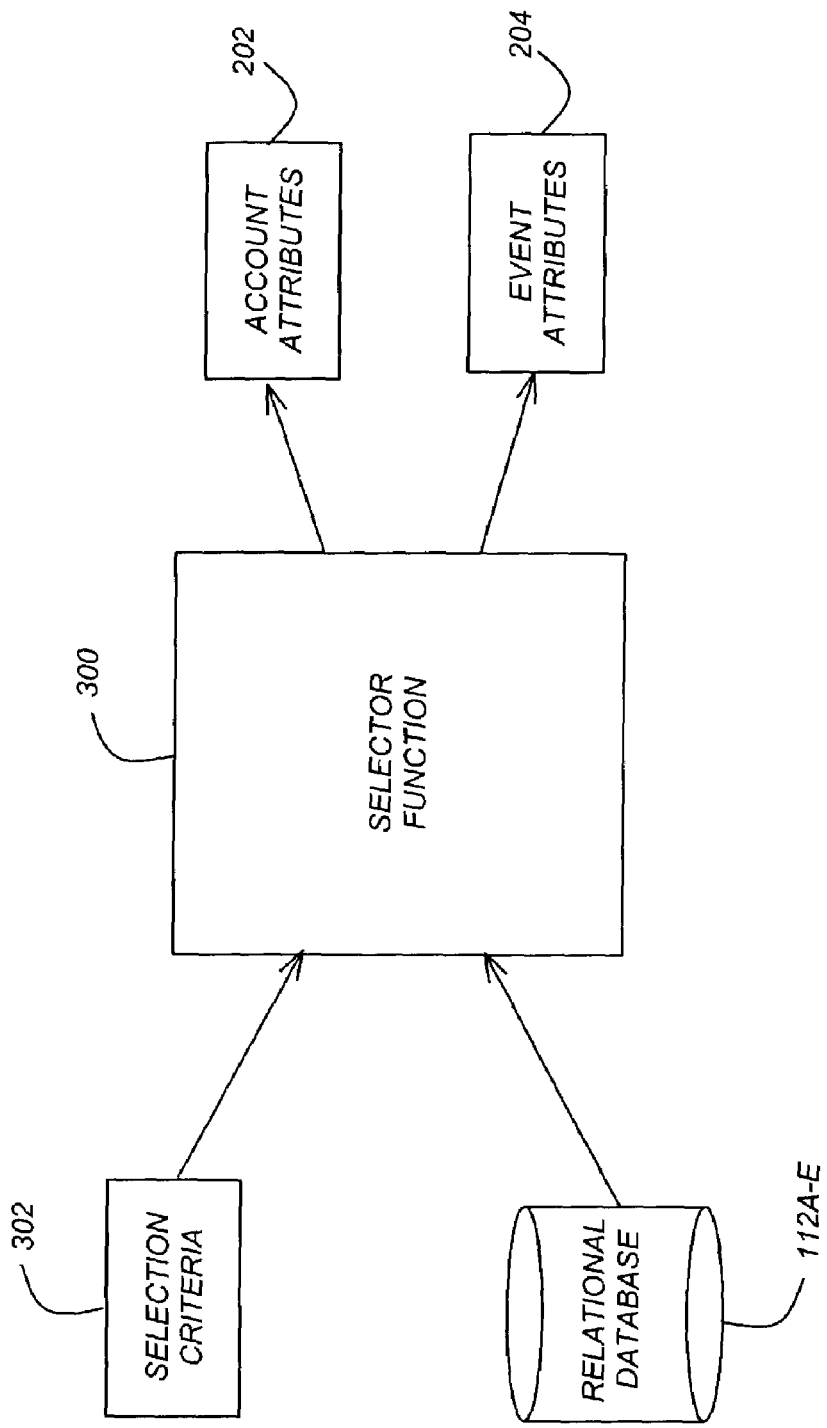
FIG. 3 illustrates a selector function included in a Value Analyzer system according to the preferred embodiment of the present invention.

FIG. 3 illustrates a Selector function 300 included in the Value Analyzer system according to the preferred embodiment of the present invention. Within the Value Analyzer Calculation Engine 104, the Selector function 300 selects accounts and events from the relational database managed by the RDBMS 106 in order to generate a number of inputs for the Profitability Calculations 200, including Account Attributes 202 and Event Attributes 204. Because of the limited amount of data associated with the Organization Attributes 206 and Profit Factors 208, these inputs to the Profitability Calculations 200 do not require the capabilities of the Selector function 300, although the Selector function 300 could be used with these inputs as well.

Selection Criteria

In the Value Analyzer system, the Selector function 300 uses one or more sets of Selection Criteria 302 to determine which accounts and events should be processed. In the preferred embodiment, the following types of Selection Criteria 302 may be used:
Product Groups;
Balance Types;
Account Event Groups;
Master Account Event Groups;
Account Attributes; and
Master Account Attributes.

Other types of Selection Criteria 302 may be used as well.

The Selection Criteria 302 may comprise attributes, predicates, operators and/or functions, wherein a group of accounts or events that satisfy the Selection Criteria 302 comprise partitions. For example, it is possible to compare an account attribute (i.e., a column) to another account attribute, a literal value, or a domain value (which is an indirect reference to a literal value that is resolved by a lookup function). Operators may include any number of different relational operators, i.e., $=, >=, <=, <, >$, BETWEEN, etc., and functions may comprise aggregations or other functions.

The Selection Criteria 302 may also include dynamic event attributes. For example, multiple event attributes may be defined for each account. The event attribute definition can vary both in the number of event attributes used to identify account events, and in the identity of the event attributes. This means that the selection of accounts having specific combinations of event attributes is dynamic, rather than static.

Source, Target and Driver Components

In the Value Analyzer system, each Rule 210 performed by the Profitability Calculation 200 can include multiple sets of Selection Criteria 302. Specifically, each Rule 210 performed by the Profitability Calculation 200 is comprised of Source, Target and Driver components, and each of these components can have Selection Criteria 302. In this context, a Source component is a source of funds to be allocated, a Target component is a target of funds to be allocated, and a Driver component is an attribute or function that controls the allocation of funds from the source to the target (e.g., account attributes, number of accounts, event attributes, event counts, event amounts, etc.). The Selection Criteria 302 for these components can be dynamically specified by the user.

Amounts and Counts

An amount can be specified by the user for the Source component, and both amounts and counts can be specified for Driver components. The specification of amounts or counts, combined with the Selection Criteria 302, requires that the Selector function 300 dynamically select the proper sets of accounts or events, and aggregate the user-specified amounts or counts. Generally, this selection and aggregation will be different from one rule to another, and from one Profitability Calculation 200 to another.

Event Thresholding

The Selector function 300 may use the amounts and counts to perform event thresholding when forming an Account or Master Account Event Group. For example, the Selector function 300 may be programmed to only select accounts that have some specified number of some specified combinations of event attributes. Specifically, the Selector function 300 looks for accounts that meet any of the Selection Criteria 302 specified above, wherein the amount or count of the occurrences of the event attributes is summed to determine whether they meet a user-specified threshold test. The SQL statements used for processing the user-specified threshold test are optimized so that the RDBMS 106 can perform them in parallel to avoid making multiple passes through large tables in the relational database.

In the preferred embodiment, financial institutions can identify one or more event attributes in their Rules 210 in order to form an Event Group (whether for Accounts or Master Accounts). Threshold tests are then applied by the Selector function 300 to these event attributes in the Event Group to select Accounts or Master Accounts. The threshold tests must be completed before the Profitability Calculations 200 can be performed.

Rule Screening

Once the lists of Selection Criteria 302 have been specified, the next step is to screen the Rules 210 and Selection Criteria 302 of the Profitability Calculation 200. Specifically, any Rules 210 or Selection Criteria 302 that the Selector function 300 does not need to execute can be removed. For example:

1. If a Rule 210 is an apportionment rule, and the apportionment amount is $0.
2. If a Rule 210 does not have any Selection Criteria 302, then the Selector function 300 can skip the Rule 210. This occurs, for example, when a Rule 210 is applied to all accounts, i.e., when no Selection Criteria 302 are applied. Note that the Rule 210 can be removed only if the Source, Driver, and Target components all lack Selection Criteria 302.
3. If the Selection Criteria 302 are objectively invalid, then the Rule 210 can be removed. For example, if an account attribute has two equality comparisons to different values, e.g., "Select all accounts where account="checking account," balance=$5000, and balance=$12000, which is objectively invalid, the Rule 210 can be removed (with an error message displayed).

Operation

Using the Selection Criteria 302 for each of the components, the Selector function 300 dynamically generates SQL statements to select the proper Accounts or Master Accounts, and to aggregate the appropriate Source or Driver amounts and counts, using an Account table and Event log table in the relational database. The Account table contains all of the accounts at a financial institution, and the Event log table contains all of the account events or transactions that occurred during a specified period at the financial institution. The present invention optimizes the dynamic generation of the SQL statements, so that multiple selection predicates can be processed in parallel by the RDBMS 106.

In the preferred embodiment, the Selector function 300 dynamically creates temporary work tables. Once these tables have been generated, the Selector function 300 dynamically invokes a set of SQL macros to perform the selection and aggregation of data from the relational database.

The SQL macros are grouped together for execution in parallel (where appropriate). Further, the SQL macros are executed in the correct sequential order through the use of a single high-level macro and a series of nested macros generated by the Selector function 300. Using this process, similar Selection Criteria 302 are grouped together and processed independently and in parallel by the RDBMS 106, and the results therefrom are stored in temporary work tables.

The Selector function 300 uses one or more parameterized templates to dynamically generate the SQL statements. This parameterized template typically comprises a join of (potentially) multiple tables within the relational database to a constraint table (storing the Selection Criteria 302) and an in-list table (storing IN clauses for the SQL templates). Both the constraint and in-list tables are created and populated from the Selection Criteria 302.

Specifically, there are several very important steps in generating the SQL statements:

1. Substantially similar Selection Criteria 302 are grouped in order to combine them into one account-partitioning set of SQL statements. In this context, "similar" does not necessarily mean identical, e.g., certain Selection Criteria 302 are considered identical for the grouping function and are later altered to match the original SQL statements.
2. Once the Selection Criteria 302 are grouped, it is necessary to convert and/or combine some of the Selection Criteria 302 in order to ensure that every Selection Criteria 302 can be expressed in the fewest number of templates.
3. One or more constraint tables are created and populated for each group of Selection Criteria 302.
4. One or more in-list tables are created and populated for all groups of Selection Criteria 302.

Standardizing Selection Criteria

For the purpose of grouping Selection Criteria 302, the Selector function 300 treats the relational operators, e.g., =, <, >, =>, <=, as equivalent to a BETWEEN operation. In fact, the Selector function 300 converts these relational operators into an equivalent BETWEEN operation according to the mappings in the following table:

| Operator | Maps to BETWEEN | Left Value | AND | Right Value |
|---|---|---|---|---|
| = X | Maps to BETWEEN | X | AND | X |
| < X | Maps to BETWEEN | MIN(X) | AND | LOWER(X) |
| <= X | Maps to BETWEEN | MIN(X) | AND | X |
| > X | Maps to BETWEEN | HIGHER(X) | AND | MAX(X) |
| >= X | Maps to BETWEEN | X | AND | MAX(X) | wherein:

MAX(X) is the maximum value of X in the domain of its data type. For example, if X is a BYTEINT value, then the maximum value of X is 127.

MIN(X) is the minimum value of X in the domain of its data type. For example, if X is a BYTEINT value, then the minimum value of X is −128.

LOWER(X) is the next lowest value of X in the domain of its data type. For example, if X is a BYTEINT value, then the next lower value of X is 'X−1' (unless X is already −128).

HIGHER(X) is the next greater value of X in the domain of its data type. For example, if X is a BYTEINT value, then the next greater value of X is 'X+1' (unless X is already 127).

If the relational operator in the Selection Criteria 302 is of the type '>=', '<=', '>', or '<', then there may exist another Selection Criteria 302 within the group of Selection Criteria 302 that matches, i.e., that would form a valid BETWEEN operation. To match first and second Selection Criteria 302, the first and second Selection Criteria 302 must be the same attribute, and if the relational operator of the first Selection Criteria 302 is either '>=' or '>', then it will match either '<=' or '<' in the second Selection Criteria 302. Likewise, if the relational operator of the first Selection Criteria 302 is '<=' or '<', then it will match either '>=' or '>' in the second Selection Criteria 302. Once a matching pair of first and second Selection Criteria 302 is found, the combination into one BETWEEN operation is straightforward. It is worth noting that, just as in the simple case, '<X' results in 'BETWEEN Y AND LOWER(X)' and '>X' results in 'BETWEEN HIGHER (X) and Y'.

Grouping Selection Criteria, Sources and Drivers

As noted above, the Selector function 300 optimizes the dynamic generation of SQL statements, so that multiple Selection Criteria 302 can be processed in parallel by the RDBMS 106. Generally, this requires an understanding of the operation of the Parsing Engine 108 of the RDBMS 106, and how it transforms SQL statements into an operator tree that, in turn, can be used to generate multiple, parallelized access plans for execution by Access Module Processors 110A-E of the RDBMS 106.

In generating the SQL statements, the Selector function 300 groups multiple sets of Selection Criteria 302 together and processes the groups in parallel to the extent possible, and generates several sets of output tables. The goal is to process similar selection predicates together at the same time, so that fewer passes need to be made through the tables in the relational database. In a final pass, these output tables are filtered and combined to produce the correct sets for each Source, Target, and Driver component in the Rules 210 of the Profitability Calculation 200.

This step is necessary because the Profitability Calculations 200 are scripts that operate against known, statically defined, tables. In the Value Analyzer system, the specification of Selection Criteria 302, and the attributes that can be used in the selection process, are completely dynamic and user-driven. There is no way for the scripts to contain this knowledge, nor can it be predefined as part of the scripts.

When grouping Selection Criteria 302, the following is required:

1. The Selection Criteria 302 has to be applied to the same level of accounts.
2. That each of the Selection Criteria 302 are of the same types of Selection Criteria 302. For example, if two Selection Criteria 302 include both Product Group and Account Attribute, these can be grouped together. If one of the Selection Criteria 302 includes only Product Group, and the other Selection Criteria 302 includes both Product Group and Account Attribute, then these cannot be grouped together.
3. That each of the Selection Criteria 302 access the same attributes or columns. Note that an alternative embodiment would only require that each of the Selection Criteria 302 access the same table.

Using the above, each distinct group of Selection Criteria 302 can be processed independently. This allows the Selector function 300 to process each distinct group of Selection Criteria 302 in parallel. In this context, a partition is a set of one or more accounts that satisfy one or more Selection Criteria 302, in order to apply costs and revenues to each account.

Some groups of Selection Criteria 302 are used for more than simply the selection of Accounts or Master Accounts. In some cases, they are used to aggregate Sources or Drivers. These groups of Selection Criteria 302 follow slightly more complex grouping rules.

When grouping Sources, the following conditions must be true. These conditions are checked before the grouping conditions for normal Selection Criteria 302 are checked. Only if all conditions are true can groups of Selection Criteria 302 be grouped together.

1. The Source attributes must be the same in order for the Selection Criteria 302 to be processed together. This is done because part of the SQL statements created includes selecting the amount value from the specified attribute.
2. All grouping criteria found in the grouping Selection Criteria 302 steps described above.

When grouping Drivers, the following conditions must be true. These conditions are checked before the grouping conditions for normal Selection Criteria 302 are checked. Only if all conditions are true can groups of Selection Criteria 302 be grouped together.

1. The target level for the Drivers must be the same. To be grouped together, the target level must be either all Master Accounts or all Accounts, since each set of data is written to different output tables.
2. Only groups of Selection Criteria 302 that retrieve the same type of Drivers (and Driver values) can be selected in the same SQL statements. Note that for grouping Drivers, Account Event Amount and Account Event Count Drivers can be grouped together, since in both cases, the Selector function 300 will select the Event Count and Amount at the same time. Similarly, Master Account Event Amount and Master Account Event Count can also be grouped together. These are being processed together in an effort to group more statements together for parallel execution by the Selector function 300.
3. All grouping criteria found in the grouping Selection Criteria 302 steps described above.

SQL Optimization

In the preferred embodiment, the Selector function 300 optimizes the SQL statements that are dynamically generated based on user-specified Selection Criteria 302. The basic principles of this optimization are:

Satisfy the Selection Criteria 302 using as few SQL statements as possible, and Generate SQL statements that can be executed in parallel by the RDBMS 106.

Two features of the RDBMS 106 motivate the method chosen for optimization.

First, it is assumed that every SQL statement that partitions accounts needs to perform a full file scan of one or more tables in the relational database. A full file scan reads every single row of a table and, since it is assumed that the tables are distributed evenly across, all AMPs 110A-E in the RDBMS 106, it therefore means that every AMP 110A-E uses one worker task to read the rows to satisfy the query. However, each AMP 110A-E has a limited pool of worker tasks. Hence, only a limited number of full file scans can take place at any time and therefore only a limited number of SQL statements generated by the Selector function 300 can take place at any time.

The synchronous scan feature of the RDBMS 106 allows multiple worker tasks to share the same read activity. If two tasks are scanning the same table in the relational database the same time, then the RDBMS 106 is only going to perform the scan once. If one of the tasks starts the scan earlier than the other one, the second task starts reading wherever the first task happens to be. When the scan reaches the end of the table, the first task is completed, but the second task starts the scan again at the beginning of the table, in order to pick up whatever it missed in the first pass. Because the queries generated by the Selector function 300 will tend to scan many of the same tables in the relational database, it is an overall performance improvement if all of the queries can run at the same time in order to minimize the total amount of disk scanning necessary to complete all of the SQL statements.

Macro Creation

The Selector function 300 uses a series of nested macros to group SQL statements together for parallel execution, and to ensure that all steps or SQL statements are executed in the proper order. These nested macros are, in turn, grouped into a high-level control macro that is responsible for executing all macros in the correct sequence.

In the general case, there are three types of SQL macros:

One or more Non-Event Based Selection and Aggregation Macros,

One or more Event-Based Selection and Aggregation Macros, and

One or more Collation Macros (which combines the results of the first two types of macros).

Of course, not all three macros may be used in every situation.

Each of these macros can be executed in parallel. Moreover, these three macros are, in turn, nested into a Control Macro. The Control Macro is responsible for executing all types of SQL macros in the correct sequence. By nesting all of the macros into a hierarchical series of macros, the Control Macro becomes the single point of execution for processing the dynamic selection and aggregation of data.

Output Tables

After the temporary work tables have been created, the Selector function 300 filters and combines the temporary work tables, yielding output tables corresponding to the inputs for the Profitability Calculations 200, namely, the Account Attributes 202 and Event Attributes 204. These output tables include the account partitions for the rule, wherein the account partitions represent the target accounts against which the profitability rules are applied. The output tables are then processed by one or more of the Profitability Calculations 200 in the Value Analyzer Calculation Engine 104 to accomplish a final result.

Logic of the Preferred Embodiment

Figure 4:
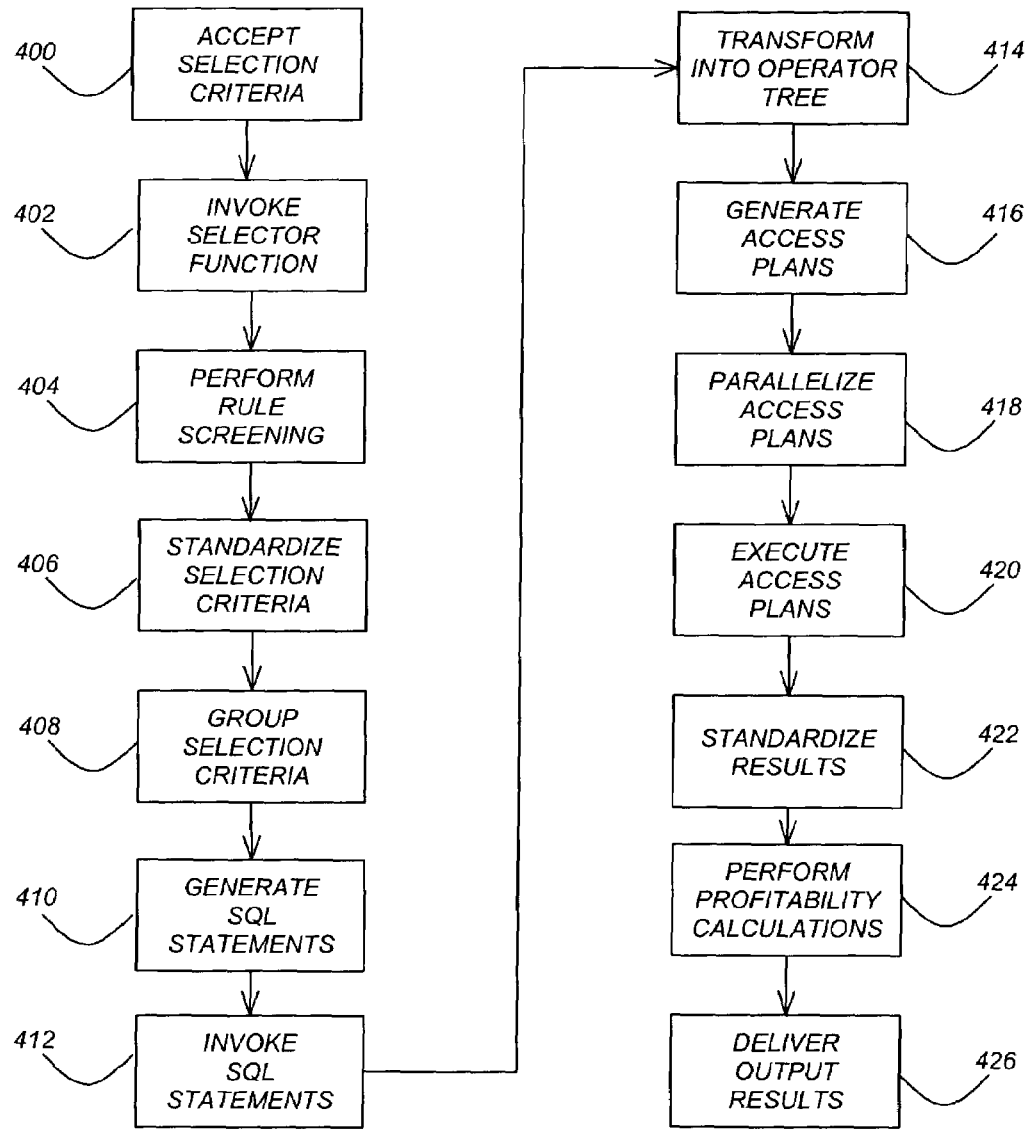
FIG. 4 is a flow chart illustrating the logic of the preferred embodiment of the present invention.

FIG. 4 is a flow chart illustrating the logic of the preferred embodiment of the present invention. Those skilled in the art will recognize that this logic is provided for illustrative purposes only and that different logic may be used to accomplish the same results.

Block 400 represents the Value Analyzer Client 102 accepting one or more Selection Criteria 302 from the user, which may include Selection Criteria 302 for Source, Target and Driver Components, Amounts and Counts, as well as event thresholding values.

Block 402 represents the Value Analyzer Calculation Engine 104 invoking a Selector function 300 for selecting accounts and events from the relational database based on the specified Selection Criteria 302 prior to the execution of the Profitability Calculations 200. Preferably, the Selector function 300 uses event thresholding to select the accounts and events from the relational database, wherein the event thresholding uses a specified number of a specified combination of attributes of the events to select the accounts. The specified number comprises an amount of the attributes or a count of the attributes, and the accounts are selected when the specified number exceeds a specified threshold.

Block 404 represents the Selector function 300 performing rule screening for the selected accounts and events from the relational database based on the specified Selection Criteria 302.

Block 406 represents the Selector function 300 standardizing the Selection Criteria 302.

Block 408 represents the Selector function 302 grouping the standardized Selection Criteria 302, so that the grouped Selection Criteria, which comprise similar Selection Criteria 302, are processed independently and in parallel. The Selection Criteria 302 are grouped when the Selection Criteria 302 are applied to a same level of the accounts, when the Selection Criteria 302 are of a same type, when the Selection Criteria 302 access identical attributes, or when the Selection Criteria 302 access identical tables. Moreover, the grouped Selection Criteria 302 may aggregate Sources or Drivers for the Rules 210.

Block 410 represents the Selector function 300 dynamically generating SQL statements for the selected accounts and events from the relational database based on the specified Selection Criteria 302, wherein the SQL statements are optimized for processing by the RDBMS 106. Preferably, the SQL statements are optimized to satisfy the Selection Criteria 302 using as few of the SQL statements as possible, and so that the SQL statements are executed in parallel by the RDBMS 106.

Block 412 represents the Selector function 300 invoking the dynamically generated SQL statements as SQL macros performed within the RDBMS 106, in order to perform the selection of the accounts and events. Preferably, the SQL macros are grouped together for execution in parallel by the RDBMS 106. Moreover, the SQL macros are executed in a correct order by nesting the SQL macros and grouping the nested SQL macros into a high-level control macro. The nested SQL macros are selected from a group comprising one or more Non-Event Based Selection and Aggregation Macros, one or more Event-Based Selection and Aggregation Macros, and one or more Collation Macros.

Block 414 represents the Parsing Engine 108 of the RDBMS 106 transforming the SQL statements into an operator tree.

Block 416 represents the Parsing Engine 108 of the RDBMS 106 generating one or more access plans from the operator tree.

Block 418 represents the Parsing Engine 108 of the RDBMS 106 parallelizing the access plans, and then transmitting the access plans to their assigned Access Module Processors 110A-E of the RDBMS 106.

Block 420 represents the Access Module Processors 110A-E of the RDBMS 106 executing the access plans, and thereby performing the required data manipulation associated with the access plans received from the Parsing Engine 108, wherein the required data manipulation associated with the access plans are performed in parallel by the Access Module Processors 110A-E.

Block 422 represents the Parsing Engine 108 of the RDBMS 106 standardizing the results received from the Access Module Processors 110A-E and providing the standardized results to the Value Analyzer Calculation Engine 104 as account and event attributes.

Block 424 represents the Value Analyzer Calculation Engine 104 invoking and performing the Profitability Calculations 200 using the account and event attributes accessed from the RDBMS 106, as well as one or more organization attributes, profit factors and rules.

Block 426 represents the Value Analyzer Calculation Engine 104 delivering the output or results from the Profitability Calculations 200 to the Value Analyzer Client 102 and/or the RDBMS 106. With regard to the Value Analyzer Client 102, the results may be presented to the user, printed, or used by various other computer programs, as desired. With regard to the RDBMS 106, the results may be stored for later use by the Value Analyzer Client 102, the Value Analyzer Calculation Engine 104, or other computer programs, as desired.

CONCLUSION

This concludes the description of the preferred embodiment of the invention. The following paragraphs describe some alternative embodiments for accomplishing the same invention.

In one alternative embodiment, any type of computer or configuration of computers could be used to implement the present invention. In addition, any database management system, decision support system, on-line analytic processing system, or other computer program that performs similar functions could be used with the present invention.

In summary, the present invention discloses a Value Analyzer system, which is a data-driven computer-facilitated financial model that provides accurate and consistent profitability calculations using account and event data stored in a relational database managed by a relational database management system (RDBMS), wherein the account data comprises attributes of the accounts being measured and the event data comprises attributes of account-related transactions. A selector function uses selection criteria to select accounts and events from the relational database in order to generate a number of inputs for profitability calculations.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method of performing financial processing, comprising:
 (a) selecting accounts and events from a database through a selector function performed by a computer, wherein the selector function is programmed to use event thresholding to select the accounts from the database based on a threshold test for related events selected from the database; and
 (b) performing one or more profitability calculations in the computer using attributes of the accounts and events selected from the database.

2. The method of claim 1, wherein the event thresholding uses a specified number of a specified combination of attributes of the events to select the accounts.

3. The method of claim 2, wherein the specified number comprises an amount of the attributes.

4. The method of claim 2, wherein the specified number comprises a count of the attributes.

5. The method of claim 2, wherein the accounts are selected when the specified number exceeds a specified threshold.

6. A system for performing financial processing, comprising:
 one or more computers;
 logic, performed by the computers, for:
 (a) selecting accounts and events from a database through a selector function, wherein the selector function is programmed to use event thresholding to select the accounts from the database based on a threshold test for related events selected from the database; and
 (b) performing one or more profitability calculations using attributes of the accounts and events selected from the database.

7. The system of claim 6, wherein the event thresholding uses a specified number of a specified combination of attributes of the events to select the accounts.

8. The system of claim 7, wherein the specified number comprises an amount of the attributes.

9. The system of claim 7, wherein the specified number comprises a count of the attributes.

10. The system of claim 7, wherein the accounts are selected when the specified number exceeds a specified threshold.

11. An article of manufacture comprising a storage device embodying instructions that, when read and executed by a computer, result in the computer performing a method of financial processing, comprising:
 (a) selecting accounts and events from a database through a selector function performed by a computer, wherein the selector function is programmed to use event thresholding to select the accounts from the database based on a threshold test for related events selected from the database; and
 (b) performing one or more profitability calculations in the computer using attributes of the accounts and events selected from the database.

12. The article of manufacture of claim 11, wherein the event thresholding uses a specified number of a specified combination of attributes of the events to select the accounts.

13. The article of manufacture of claim 12, wherein the specified number comprises an amount of the attributes.

14. The article of manufacture of claim 12, wherein the specified number comprises a count of the attributes.

15. The article of manufacture of claim 12, wherein the accounts are selected when the specified number exceeds a specified threshold.

* * * * *

UNITED STATES PATENT AND TRADEMARK OFFICE
CERTIFICATE OF CORRECTION

PATENT NO.        : 7,680,709 B1                                    Page 1 of 1
APPLICATION NO.   : 10/227783
DATED             : March 16, 2010
INVENTOR(S)       : George R. Hood et al.

It is certified that error appears in the above-identified patent and that said Letters Patent is hereby corrected as shown below:

Title Page item 74

Attorney, Agent or Firm: Needs to read Gates & Cooper LLP

Not: Gates and Copper LLP

Signed and Sealed this
Nineteenth Day of July, 2011

David J. Kappos
*Director of the United States Patent and Trademark Office*